(12) United States Patent
Klein et al.

(10) Patent No.: US 9,374,851 B2
(45) Date of Patent: Jun. 21, 2016

(54) INDUCTION COIL ASSEMBLY AND INDUCTION HOB COOKING ZONE

(75) Inventors: Gerhard Klein, Neusitz (DE); Thomas Dehnert, Rothenburg (DE); Laurent Jeanneteau, Compiegne (FR); Alex Viroli, Forli (IT); Thibaut Rigolle, Forli (IT)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 525 days.

(21) Appl. No.: 13/641,227

(22) PCT Filed: Jun. 1, 2011

(86) PCT No.: PCT/EP2011/002723
§ 371 (c)(1),
(2), (4) Date: Oct. 15, 2012

(87) PCT Pub. No.: WO2011/157361
PCT Pub. Date: Dec. 22, 2011

(65) Prior Publication Data
US 2013/0032590 A1 Feb. 7, 2013

(30) Foreign Application Priority Data
Jun. 18, 2010 (EP) .................................... 10006332

(51) Int. Cl.
*H05B 6/36* (2006.01)
*H05B 6/12* (2006.01)

(52) U.S. Cl.
CPC ............. *H05B 6/1272* (2013.01); *Y02B 40/126* (2013.01)

(58) Field of Classification Search
CPC ........ H05B 6/1272; H05B 2206/00–2206/024; Y02B 40/126
USPC ...................................... 219/672–677
See application file for complete search history.

(56) References Cited

U.S. PATENT DOCUMENTS

| | | | | |
|---|---|---|---|---|
| 3,742,174 | A * | 6/1973 | Harnden, Jr. .................. | 219/627 |
| 3,786,222 | A * | 1/1974 | Harnden et al. .............. | 219/622 |
| 3,947,652 | A * | 3/1976 | Cobb ............................ | 219/622 |
| 4,511,781 | A * | 4/1985 | Tucker et al. ................. | 219/626 |

FOREIGN PATENT DOCUMENTS

| | | |
|---|---|---|
| CN | 2579131 Y | 10/2003 |
| DE | 202006016551 | 3/2008 |
| DE | 102007037881 | 1/2009 |
| EP | 1335632 | 8/2003 |
| EP | 2048914 | 4/2009 |
| GB | 2048025 | 12/1980 |
| JP | 2005026204 | 1/2005 |

OTHER PUBLICATIONS

English Machine-translation of JP 2005-26204, Jan. 2005.*
International Search Report for PCT/EP2011/002723, dated Oct. 27, 2011, 3 pages.

* cited by examiner

*Primary Examiner* — Sang Y Paik
(74) *Attorney, Agent, or Firm* — Pearne & Gordon LLP

(57) ABSTRACT

The present application in particular is directed to an induction coil assembly 2 adapted for an electric induction hob of a household or industrial type appliance. The induction coil assembly 2 comprises at least one induction coil 5 which has at least one of ovoid and coiled ovoid windings 6.

13 Claims, 3 Drawing Sheets

INDUCTION COIL ASSEMBLY AND INDUCTION HOB COOKING ZONE

Figure 1:
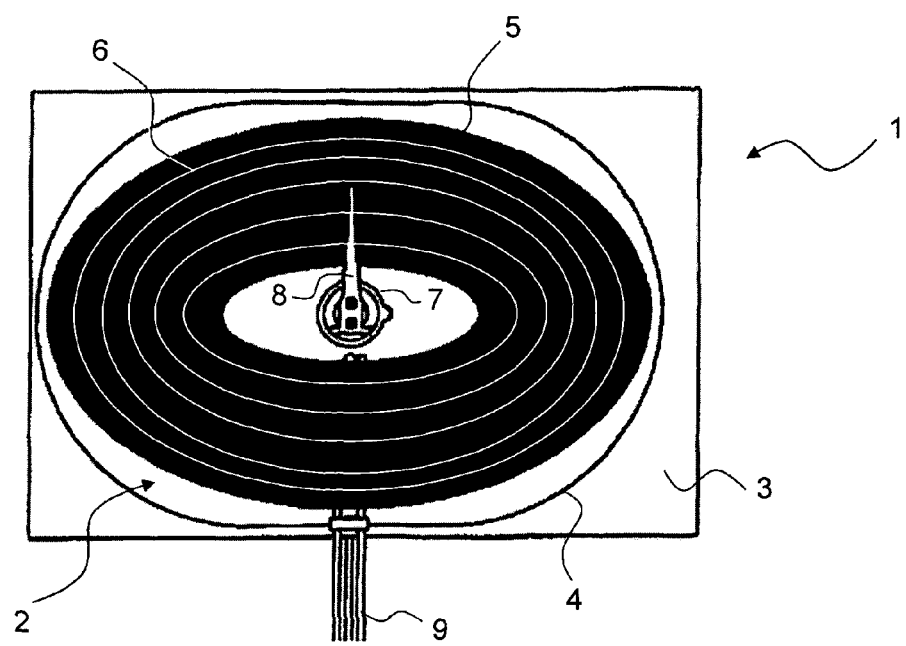

The present application is directed to an induction coil assembly, induction hob cooking zone and appliance of household or industrial type.

Induction hob cooking zones or induction hobs are known which comprise induction coils of circular or combined elliptic and linear shape. In some instances, for example for different shaped cooking utensils, such induction hob cooking zones have unsatisfactory cooking performance.

It is therefore an object of the invention to provide an induction hob assembly having a more satisfactory cooking performance, in particular for a great variety of different cooking utensils. Further, an induction hob cooking zone and appliance of household or industrial type comprising such an induction hob cooking zone shall be provided.

This object is achieved by independent claims 1, 11 and 14. Embodiments of the invention result from dependent claims.

According to independent claim 1, there is provided an induction coil assembly which is especially adapted for an electric induction hob of a household or industrial type appliance. The induction coil assembly comprises at least one induction coil which has at least one of ovoid and coiled ovoid windings, preferably of continuous curvature.

The terms ovoid and coiled ovoid windings shall be understood to exclude circular shaped and coiled circular shaped windings as well as any linear winding sections. However, singular points of zero curvature shall not be excluded. Further, ovoid and coiled ovoid windings may comprise singular sharp bends, i.e. points having infinite curvature or a zero radius of curvature. However, it is preferred that the windings have a continuously varying curvature which shall only mean that neither sharp bends nor linear sections appear along the windings. A winding of ovoid structure may have an egg-shaped form, for example, which in general is symmetric with respect to the principal axis but is non-symmetric with respect to the minor axis.

The proposed induction coil assembly, in particular induction coil assembly with continuously varying curvature, has the advantage that it can be used with a great variety of different shaped cooking utensils in each case providing satisfactory cooking performance.

In an embodiment, a coil density varies within the winding plane. The winding plane shall be understood to be a plane, in which windings of a respective induction coil are arranged. Coplanar windings of an induction coil may define a respective winding plane. It shall be mentioned, that all windings of a single induction coil may be located in a single winding plane. In a special embodiment, all induction coils may share a common winding plane. However, it shall also be possible that different induction coils have different winding planes, in which case windings of different winding planes may partially overlap or cross. Note that coil density is closely related to the distance between adjacent windings. Hence, the coil density can be varied by varying the inter-winding distances. A single induction coil may have a constant coil density. However, it is also possible that the coil density of a single induction coil varies. This can be for example the case if the distances between windings in a first section of an induction coil are smaller or higher than the distances between windings in a second section. By providing varying coil densities it is possible to account for standard or standardized cooking utensil cross sections such that satisfactory cooking performance and optimal heating can be obtained for a great variety of cooking utensil shapes and sizes.

In an embodiment, at least one first group of windings and at least one second group of windings is provided, wherein the coil density of the first and second group being different. Here, the coil density may be constant or may vary for one or both groups.

The first and second group of windings may either belong to a single induction coil or to different induction coils. Preferably, windings of at least one of the first and second group mutually abut at least within a given section in the winding plane.

The term first and second group shall not be construed as limiting the induction coil assembly to only two types of groups. In fact, there may be provided more that just two groups, of which an arbitrary first and second group fulfil the above-identified above conditions. In providing several groups of windings as proposed beforehand, high cooking performance can be obtained for cooking utensils of different size and shape, in particular relating to cooking utensil bottom cross sections.

In an embodiment, the at least one first group of windings and at least one second group of windings can be spaced apart from each other. Here, standard or standardized sized and shapes of known cooking utensils can be accounted for, wherein the distance preferably is selected such that optimal cooking performance is obtained for respective cooking utensils.

The induction coil assembly may further comprise at least one power connection for supplying the induction coils or respective windings with electric power. A single power connection may respectively be connected to a single, several or a group of windings. By providing appropriate power connections, heating zones that may selectively be activated can be defined, preferably accounting for relevant shapes and sizes of cooking utensils.

In a yet further embodiment the center point or mass center of at least two windings or induction coils coincide or are spaced apart. Further, it is also possible that longitudinal axes or transverse axes of at least two windings or induction coils are oriented parallel or obliquely to each other, wherein the windings or induction coils preferably are positioned in non-overlapping arrangement. In addition, the induction coils of different longitudinal or transversal dimension may have different coil densities. Respective configurations mentioned beforehand may be used to further refine cooking zone geometries and to adapt the heating power, in particular the heating power per surface area, to respective needs.

In a yet further embodiment, a first induction coil arranged between two adjacent second induction coils has a lower or higher coil density that the second induction coils. High coil densities may be provided in preferred cooking zones, of standardized shape for example, whereas lower coil densities may be used in transition regions between preferred cooking zones. Note that such transition regions may also be used for the reason of inter-coil power connection, where inter-coil power connection may be implemented by a single winding or an induction coil of low coil density.

In particular, the use of variable coil densities makes it possible to implement comparatively large active cooking areas yet focusing on preferred cooking zones.

In a further embodiment, the induction coil assembly further comprises at least one temperature sensor, respectively and preferably arranged in the center of a winding or induction coil. Temperatures measured by such a temperature sensor may be visualized on a display element, preferably arranged on a cover plate covering a respective induction coil or several induction coils. The display element may be of any type, such as digital or analog. The display element may be implemented as a kind of pointer or a display unit. Note that temperature sensor independent display elements such as temperature sensitive coatings, in particular temperature color change coatings may be used. The display elements are intended for indicating the temperature of the cooking area.

Pointers may have an n-clock hand shape, wherein n is a natural number, i.e. integer, other than zero. Preferably, the pointer is of one clock hand shape or double clock hand shape. Clock hand shape pointers are easily perceptible and easy to implement.

The temperature sensor or sensors and display elements can in principle be freely positioned within the cooking zone. However, it is also possible to provide one or several temperature sensors or display elements in fixed positions. The proposed temperature sensors and display elements clearly enhance cooking performance, as in a subsequent operation the user can select such parts of the cooking area that were previously used and still have elevated temperature.

Independent claim 11 is directed to an induction hob cooking zone comprising at least one induction coil assembly according to the invention, in particular of any embodiment thereof described so far. The induction hob cooking zone may make up a single cooking zone or comprise several separate cooking zones, preferably of different size and/or shape.

The induction hob cooking zone may further comprise at least one indicator for indicating the location of at least one of the at least one induction coil. Such an indicator may be provided or arranged on a cover plate, preferably a glass or glassceramic cover plate, of the induction hob cooking zone, the plate covering respective induction coils of the at least one induction coil assembly. The indicator is convenient for visualizing on the cover plate the location and optimal cooking performance of respective induction coils to a user.

Independent claim 14 is directed to an appliance of household or industrial type comprising at least one induction hob cooking zone or any embodiment thereof as described beforehand.

As to advantages and advantageous effects of the induction hob cooking zone and the appliance, reference is made to the discussion above.

Figure 2:
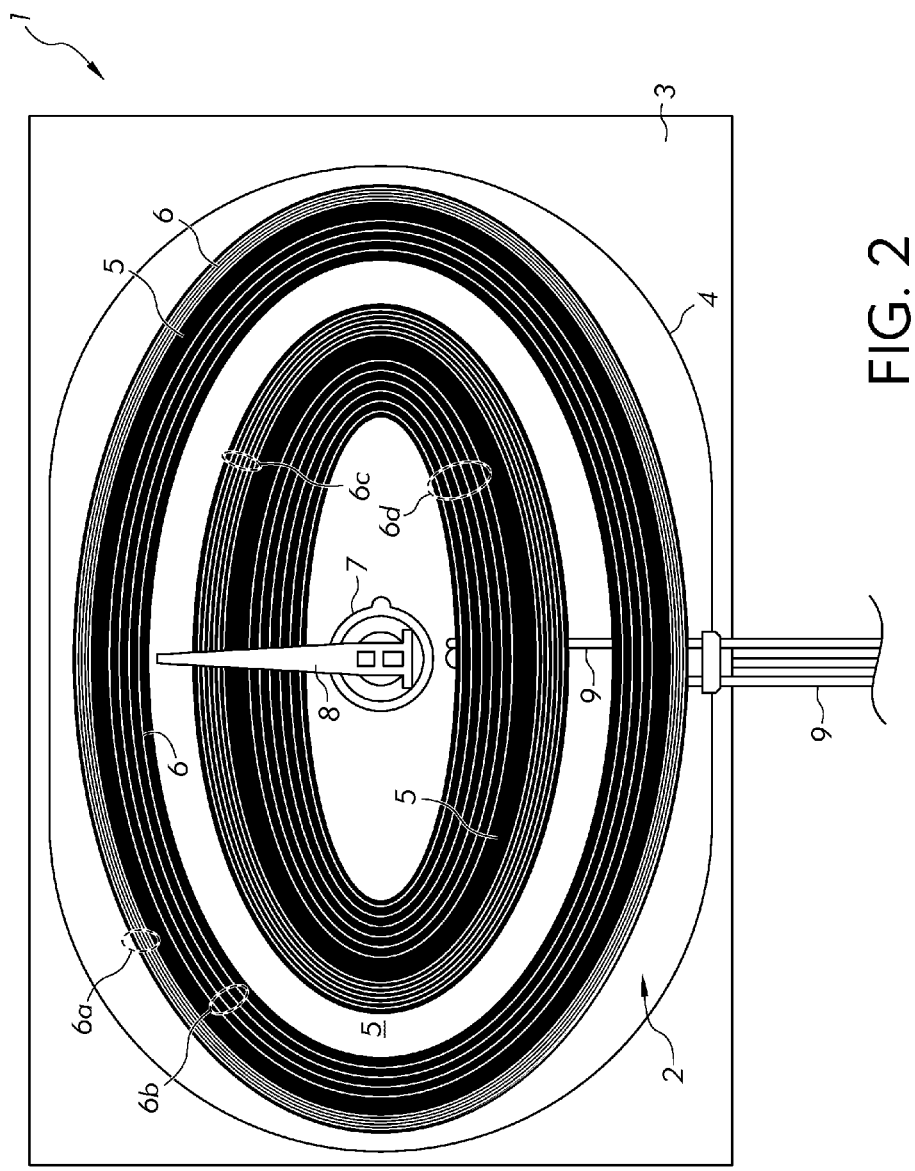
Figure 3:
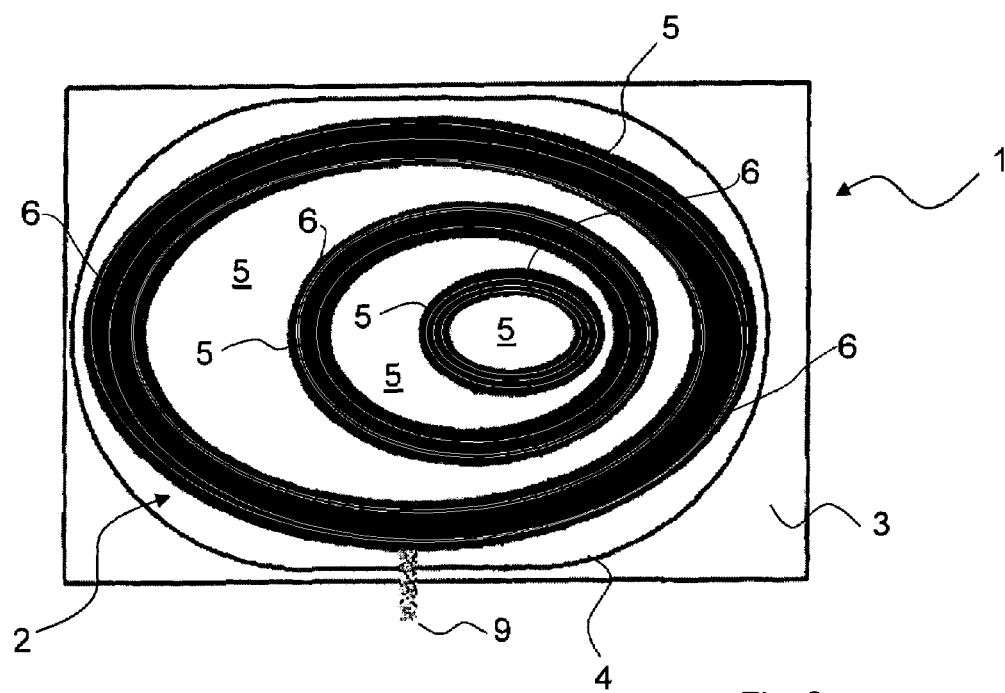

Embodiments of the invention will now be described in connection with the annexed figures, in which FIG. 1 shows a schematic view of an induction hob cooking zone of a first embodiment;

FIG. 2 shows a schematic view of an induction hob cooking zone of a second embodiment; and FIG. 3 shows a schematic view of an induction hob cooking zone of a third embodiment.

The following description of embodiments of an induction hob cooking zone shall not be construed as limiting the scope of the invention. In particular, features jointly shown in connection with respective induction hob cooking zones can be implemented alone or in any other combination as discussed further above.

If not otherwise stated like elements are denoted by like reference signs throughout the figures. The figures may not be true to scale, and scales of different figures may be different.

FIG. 1 shows a schematic view of an induction hob cooking zone 1 of a first embodiment. The induction hob cooking zone 1 may belong to an electric cooker, such as an electric kitchen stove of household or industrial appliance, for example. The cooker may but need not comprise at least one further hob cooking zone, preferably also of induction type and, if required, designed like the induction hob cooking zone 1 shown in FIG. 1.

The induction hob cooking zone 1 comprises an induction coil assembly 2. The induction coil assembly 2 is covered by a cover plate 3, preferably a glass or glass ceramic plate or a plate of other suitable material.

The cover plate 3 comprises an indicator 4 which in the present case is implemented as a line having linear and circular sections. The indicator 4 in the present case is similar to an ellipse stretched along its principal axis. The indicator 4 is intended for indicating to a user on the cover plate 3 the preferred area of induction heating and the preferred bottom shape of respective cooking utensils. In the present case only one indicator 4 is shown, but there may also be provided two or more respective indicators 4. Cooking utensils of oval bottom shape are best placed according to, i.e. in parallel to, the indicator 4, whereas cooking utensils of circular bottom shape are preferably placed in the center of the indicator 4. However, it is also possible that one or more separate indicators for circular bottom shapes are provided.

The induction coil assembly 2 of the present embodiment comprises a single induction coil 5 having several windings 6. Note that the number of windings 6 shown in the figure is not necessarily representative of the total number of windings 6 of a respective induction coil 5. For the sake of better overview, FIG. 1 exemplarily shows only a limited number of windings 6.

All windings 6 have an ovoid shape with their curvature varying continuously, i.e. there are no points of zero or infinite curvature. Due to the ovoid shape, the windings 6 have no linear sections, as is for example the case with the indicator 4. The windings 6 or at least some of them may be coiled, i.e. make up a coil or sub-coil, which is not shown in the figures for the sake of convenience.

As compared to windings or coils having straight winding sections, the windings 6 of ovoid shape as proposed herein and, if appropriate also respective coiled windings 6, were found to provide better heat development, in particular equal and optimal heat development over the effective area of induction heating. Hence, optimal and excellent cooking performance can be achieved.

The induction coil assembly 2 further comprises a temperature sensor 7 arranged approximately in the center of the induction coil 5. Upon powering the induction coil 5, the cover plate 3 is not heated directly, but may be heated indirectly via cooking utensils placed thereon, which cooking utensils are heated via induction currents induced by the induction coil 5. The temperature sensor 7 is intended for measuring the temperature of the induction hob zone, preferably in locations in which during ordinary use most elevated temperatures occur.

In order to visualize to a user elevated or high temperatures of the induction hob cooking zone 1, in particular of the area enclosed by the indicator 4, there is further provided a display element which in the present case is implemented as a clock hand shaped pointer 8. Note that the pointer can be of double or in general of n-clock hand shape with n being an integer.

One or more power connectors 9 are provided for supplying the induction coil 5 with electric power. There may be provided only a single power connector 9, connected to all windings 6 of the induction coil 5. However, it is also possible that several power connectors 9 are provided, respectively connected to a single winding 6 or a group of windings 6. Several such groups of windings may be provided, wherein the windings 6 belonging to a single group can arbitrarily be selected from all windings 6 of the induction coil. For example a group of windings 6 may comprise every second, third etc. winding 6, or may comprise several adjacent windings 6. In these cases, a group of windings 6 makes up an induction sub-coil. In providing several power connectors 9, it is possible to more exactly adjust and select the power output and location of power output.

FIG. 2 shows a schematic view of an induction hob cooking zone 1 of a second embodiment. The induction hob cooking zone 1 differs from the one of FIG. 1 in that the coil density, i.e. the number of windings per area, varies within the winding plane. Different coil densities may be implemented by varying the distance between adjacent windings in the winding plane. High coil density can be obtained by placing respective windings in close proximity to each other, including mutually abutting windings, whereas lower coil densities can be obtained by increasing the distances between adjacent windings in the winding plane.

Areas of different coil densities in the present case are indicated by different shadings, wherein dark shading indicates areas of high coil density and bright shading indicates areas of low coil density. Note that low coil density shall include zero coil density. Areas of different, non-zero coil density can be thought of making up sub-induction coils or individual induction coils 5, each respectively comprising at least one winding. The sub-induction coils or individual induction coils 5 may be spaced apart from each other, i.e. that an area of zero coil density is provided therebetween.

A winding plane in the present case shall mean a plane spanned by all windings, or as the case may be windings of a sub-induction coil or individual induction coil 5.

Similar to the embodiment of FIG. 1, one or several power connectors 9 may be provided and connected to single windings, in particular single windings of different sub-induction coils or individual induction coils 5, or connected to one or several groups of windings. A group of windings may consist of all windings of a single sub-induction coil or individual induction coil 5. Further, a group of windings may also consist of windings of different sub-induction coils or individual induction coils 5.

It shall be mentioned, that the number of sub-induction coils or individual induction coils 5 is not restricted to the number shown in FIG. 2. Rather, the number of sub-induction coils or individual induction coils 5 can be freely selected according to respective requirements, in particular with respect to different sizes and shapes of cooking utensils intended to be used with an induction hob cooking zone.

In providing areas of different coil density, in particular by adequately choosing respective power connectors 9, it is possible to fine-tune power output in the induction hob cooking zone 1. Respective coil densities may be selected according to standardized or general base or bottom diameters of cooking utensils. This has the advantage that optimal cooking performance can be obtained for respective cooking utensils.

In FIG. 2 and FIG. 3, which is described below, bright shaded areas may be designated with reference number 5, which means that respective areas have low coil density. However it is as also possible that one or all of the bright shaded areas have zero coil density.

FIG. 3 shows a schematic view of an induction hob cooking zone 1 of a third embodiment. Similarly to the second embodiment, the induction hob cooking zone 1 of the third embodiment comprises several sub-induction coils or individual induction coils 5, i.e. areas of different coil density.

The third embodiment differs from the second embodiment in that the sub-induction coils or individual induction coils 5 are arranged such that their mass center or center points are spaced apart. Note that in a variant of embodiment three (not shown) only some of the center points of sub-induction coils or individual induction coils 5 are spaced from each other, whereas center points of some of the sub-induction coils or individual induction coils 5 coincide as is the case with the second embodiment shown in FIG. 2. The center points or mass centers of respective sub-induction coils or individual induction coils 5 may be freely positioned, in a common winding plane for example.

With the third embodiment, the longitudinal axes, and thereby transverse axes, of the sub-induction coils or individual coils 5 and thereby of respective windings are oriented parallel to each other. All windings are non-overlapping. Due to a non-overlapping arrangement, the sub-induction coils or individual coils 5 can share a common winding plane. Note that the mutual orientation of longitudinal or transverse axes of sub-induction coils or individual coils 5 can be freely selected in order to obtain optimal and high cooking performance for a variety of different cooking utensils. It is also possible that transverse or longitudinal axes of some of the windings or sub-induction coils or individual coils 5 are running obliquely with respect to one another. Many other combinations or variations relating to the orientation of respective axes are conceivable and shall be covered by the present invention.

It is further possible, that windings, in particular windings of sub-induction coils or individual coils 5, are arranged in overlapping arrangement. In an overlapping arrangement, respective windings lie in different winding planes spaced from one another.

In providing sub-induction coils or individual induction coils 5, which respectively comprise at least one winding, and which mass centers or center points are spaced apart, for example mutually shifted in a common winding plane, the cooking performance can further be improved. In particular it can be accounted for a great variety of different shapes and sizes of cooking utensils to be used with the induction hob cooking zone.

Throughout the figures, only one indicator 4 was shown. However, it is possible that a cooking area of each induction coil 5 or at least some of the induction coils 5 or sub-induction coils is indicated by respective indicators 4.

In all it becomes clear that the induction coil assembly as proposed herein guarantees enhanced cooking performance.

REFERENCE SIGNS

1 induction hob cooking zone
2 induction coil assembly
3 cover plate
4 indicator
5 induction coil
6 winding
6a first group of windings
6b second group of windings
6c third group of windings
6d fourth group of windings
7 temperature sensor
8 pointer
9 power connector

The invention claimed is:

1. Induction coil assembly (2) adapted for an electric induction hob of a household or industrial type appliance, comprising:
at least one induction coil (5) having at least one of ovoid and coiled ovoid windings (6) of continuously varying curvature, said windings (6) comprising at least one first group of windings (6a) having a first coil density and at least one second group of windings (6b) having a second coil density, said first coil density being a high coil density and said second coil density being a low coil density, wherein a distance between adjacent windings (6) within the at least one first group of windings (6*a*) with the high coil density is smaller than the distance between adjacent windings (6) within the at least one second group of windings (6*b*) with the low coil density.

2. Induction coil assembly (2) according to claim 1, wherein the first coil density and the second coil density vary within the winding plane.

3. Induction coil assembly (2) according to claim 1, wherein the at least one first group of windings and at least one second group of windings are spaced apart from each other at least in a given section of the winding plane.

4. Induction coil assembly (2) according to claim 1, further comprising at least one power connection (9) connected to a single, several or a group of windings (6).

5. Induction coil assembly (2) according to claim 1, wherein the center point or mass center of the at least one first group of windings (6) and the at least one second group of windings (6) are spaced apart.

6. Induction coil assembly (2) according to claim 1, wherein longitudinal axes or transverse axes of at least two windings (6) or induction coils (5) are oriented parallel or running obliquely with respect to one another, wherein the windings (6) or induction coils (5) preferably are positioned in non-overlapping arrangement.

7. Induction coil assembly (2) according to claim 6, wherein induction coils (5) of different longitudinal or transversal dimension have different coil densities.

8. Induction coil assembly (2) according to claim 1, wherein a first induction coil (5) arranged between two adjacent second induction coils (5) has a lower or higher coil density than the second induction coils (5).

9. Induction coil assembly (2) according to claim 1, further comprising at least one temperature sensor (7) arranged in the center of a winding (6) or induction coil (5), and a display element for indicating a temperature measured by the temperature sensor (7), the display element preferably being a pointer (8) having an n-clock hand shape.

10. Induction hob cooking zone (1) comprising at least one induction coil assembly (2) according to claim 1.

11. Induction hob cooking zone (1) according to claim 10, further comprising at least one indicator (4) for indicating the location of at least one of the at least one induction coil (5).

12. Induction hob cooking zone (1) according to claim 10, the at least one indicator (4) being arranged on a cover plate (3), preferably a glass or glassceramic cover plate, covering respective induction coils (5) of the at least one induction coil assembly (2).

13. Appliance of household or industrial type comprising at least one induction hob cooking zone (1) according to claim 10.

* * * * *